United States Patent [19]

McConnell

[11] 4,146,832
[45] Mar. 27, 1979

[54] CONSTANT CURRENT SERIES-SWITCHING REGULATOR

[75] Inventor: Brian McConnell, Coquitlam, Canada

[73] Assignee: GTE Lenkurt Electric (Canada) Ltd., Burnaby, Canada

[21] Appl. No.: 817,316

[22] Filed: Jul. 20, 1977

[30] Foreign Application Priority Data

Jul. 21, 1976 [CA] Canada .......................... 257498/76

[51] Int. Cl.² .............................................. G05F 1/56
[52] U.S. Cl. ...................................... 323/17; 323/20; 323/DIG. 1; 363/19
[58] Field of Search ..................... 323/17, 20, DIG. 1; 363/18, 19, 41, 124

[56] References Cited

U.S. PATENT DOCUMENTS

| 3,790,878 | 2/1974 | Brokaw | 323/17 |
| 3,792,341 | 2/1974 | Kime | 323/DIG. 1 |
| 4,070,699 | 1/1978 | Einbinder | 323/DIG. 1 |

Primary Examiner—A. D. Pellinen
Attorney, Agent, or Firm—Douglas M. Gilbert

[57] ABSTRACT

When connected to a source of unregulated DC power, a series switching regulator delivers a constant output current to a load. A series switch, in response to a control signal, adjusts the flow of input power by switching ON and OFF. The switching operation generates a gated power signal having a variable duty cycle, and the duty cycle depends on the power demands of the load. During the period when the switch is ON, the energy in the gated power signal is stored in the magnetic field of a transformer. During the period when the switch is OFF, the transformer releases the stored energy to capacitive storage devices and to the output load. The capacitive storage devices also supply current to the load when the transformer is storing energy. Feedback signals from voltage and current sensors combine to form a single control signal which adjusts the duty cycle of the switch until the power demands of the load are met.

5 Claims, 2 Drawing Figures

CONSTANT CURRENT SERIES-SWITCHING REGULATOR

BACKGROUND OF THE INVENTION

The present invention is directed to power regulating circuits, also called converters and power supplies, and more specifically to a constant-current type of series-switching regulator.

Series-switching regulators have several advantages over other types of non-switching regulators and shunt-type switching regulators. The efficiency of power conversion is inherently better in a series-switching arrangement. Efficiency is particularly important in moderate and high power applications since internal overheating of the regulator can result in inefficient circuits. The overall efficiency for series-switching regulators is typically 80–85%.

There are two different techniques used in series switching regulators to control the transfer of power to the load. One design uses a separate multivibrator (oscillator) to control the switching rate of the series-regulator switch. A feedback signal from the regulator output circuit indirectly adjusts the waveform of the multivibrator, which in turn sets the duty cycle of the switched input power. The switched power signal is usually integrated by a lowpass filter thereby providing a steady flow of power into the load.

The series-switching regultor switch using a separate multivibrator has the disadvantage of being difficult to control since multivibrators generally prefer to operate at a fixed duty cycle. Also, the stability of the entire regulator circuit can be a problem under no load or full load conditions. Consequently, this design tends to be complex and uneconomical, considering the added circuitry for stabilization of the overall regulator and control of the multivibrator.

Another control technique used in switching regulators is known as the self-oscillating technique. In the self-oscillating design, the power needs of the output automatically determine the switching rate of the switching regulator. This technique has the advantage of not requiring separate multivibrators, and regulators using this design have a faster response to changes in the load termination. There is less chance of damage to the regulator circuitry if it is able to respond rapidly to changes in load. This feature is particularly important if extreme changes in the load termination are possible. Usually, the self-oscillating technique is used for step-down voltage applications for reasons of efficiency. Further, the output voltage polarity is the same as the input unless a separate inverter circuit is used at the output of the regulator This additional circuitry tends to add expense, complexity, and inefficiencies.

OBJECTS AND SUMMARY OF THE INVENTION

It is an object of this invention to provide an improved series-switching regulator circuit using the self-oscillating type design technique.

It is another object of this invention to provide an efficient constant current regulator which generates either a positive or negative voltage over a range which exceeds the input voltage range.

In accordance with the above objects, there is disclosed a novel circuit which when connected to a source of DC input power, delivers a constant output current to load resistance. A series-switch, in response to a feedback control signal, adjusts the flow of DC input power by switching ON and OFF. The switching operation generates a gated power signal having a variable duty cycle. During the period when the switch is ON, i.e., closed, the energy in the gated power signal is stored in the magnetic field of a transformer. And, during the period when the switch is OFF, the transformer releases the stored energy to capacitive storage devices and to the output load. The capacitive storage devices also supply current to the output load during the period when the transformer is storing energy. This assures that a constant flow of current is always provided to the load. Feedback signals from voltage and current sensors combine in a feedback network to form a single control signal. The control signal controls the switching operation of the series switch, and hence, controls the duty cycle of the gated power signal. As the energy demands of the load increase, the duty cycle increases proportionately to just match the power requirements of the load.

DETAILED DESCRIPTION OF THE PREFERRED EMBODIMENTS

Figure 1:
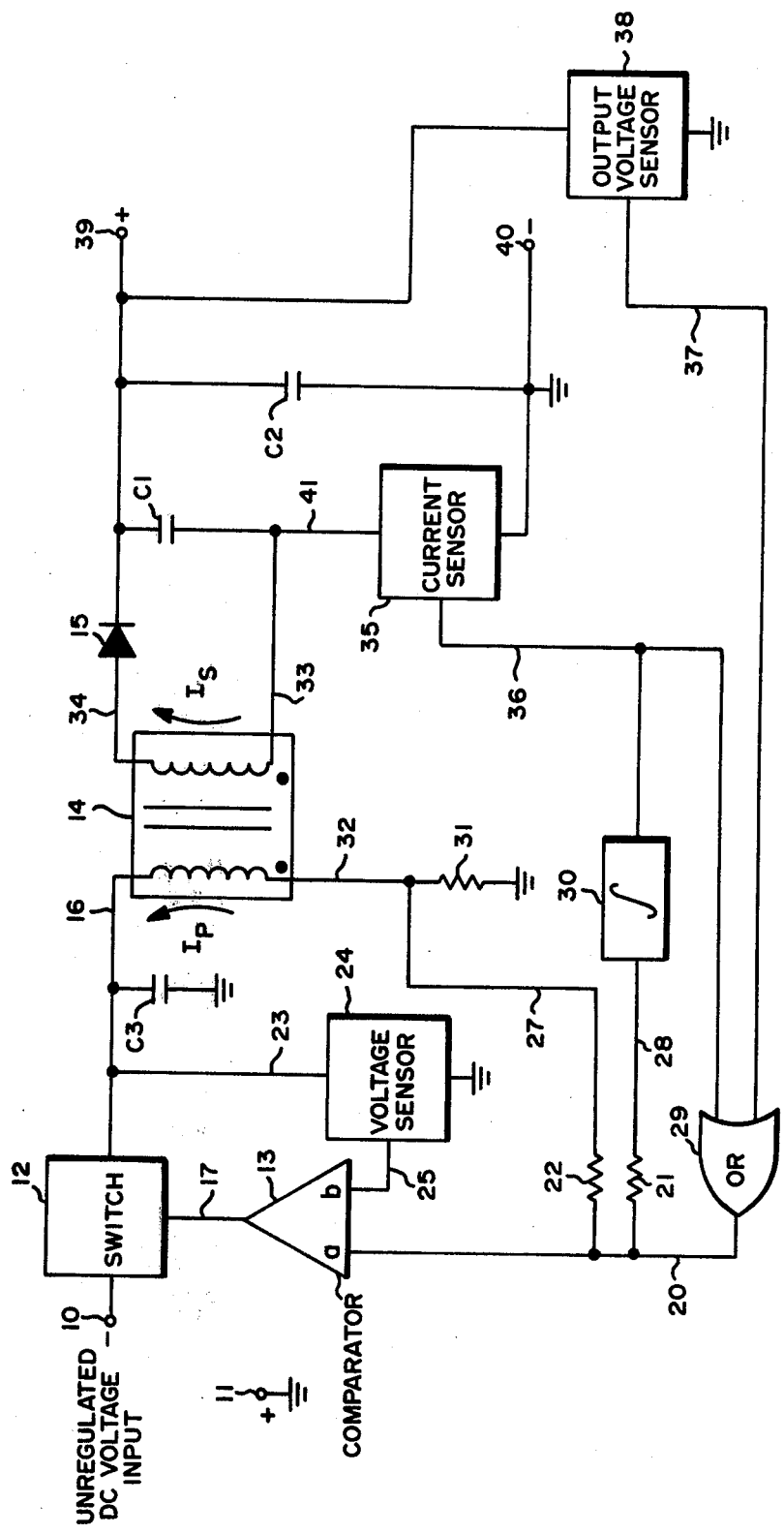
FIG. 1 is a block diagram of the preferred embodiment of this invention.

FIG. 1 illustrates a constant-current switching regulator with input terminals 10 and 11 and output terminals 39 and 40. In normal operation, the regulator input is connected to an external source of unregulated DC voltage (not shown), and the regulator provides at its output a predetermined direct current to a load termination (also not shown) connected across terminals 39 and 40. Since the regulator maintains a constant current, the voltage at the output terminals varies depending upon the particular load resistance. With a large resistance or an open circuit at the output, the output voltage is a maximum and with a short circuit across the output, the output voltage is a minimum. The actual voltage range at the output can be much greater than the nominal input voltage due to the inherent operation of the regulator circuit.

Input terminals 10 and 11 are internally connected to power switch 12, which is typically a compound transistor circuit. The function of switch 12 is to adjust the transfer of electrical energy from the power source to the rest of the regulator circuit and ultimately to the load. Switch 12 performs this regulating function by opening and closing the electrical path from its input, terminal 10, to its output, path 16. The interrupted signal on path 16, called a gated power signal, is applied to the primary windings of transformer 14. Transformer 14 is an iron core device which does not saturate under the voltage swing of the gated power signal. As switch 12 opens and closes, the transformer periodically charges and discharges in response to the energy in the gated power signal.

During the charge period, the energy transferred through the switch is stored in the transformer's magnetic field. When the switch opens, the flow of energy into the transformer stops, and the field collapses inducing a current flow in the secondary windings. During each discharge period, a current, $I_s$, flows through the secondary windings, through diode 15, and divides into capacitors C1 and C2, and into the load connected across terminals 30 and 40. During the charge period, there is no current flow out of the secondary windings, and, therefore, capacitors C1 and C2 supply current to a load across output terminals 39 and 40.

Controlling the duty cycle of switch 12, is the function of feedback signals from current and voltage sensors. In the primary circuit of transformer 14 is resistor 31, which functions as a primary current sensor. The voltage developed across the resistor is proportional to the instantaneous primary current $I_p$. A second current sensor 35, generates a binary feedback signal on lead 36. When the current through current sensor 35 is above a predetermined threshold, the binary signal on path 36 exhibits a high state, and when this current is below the same predetermined threshold, the binary signal on 36 exhibits a low state. This current sensor could be implemented with a resistor connected between path 41 and ground. Then the voltage developed on path 41, could be applied to the input of a bistable voltage comparator having a fixed voltage connected to the second input.

Figure 2:
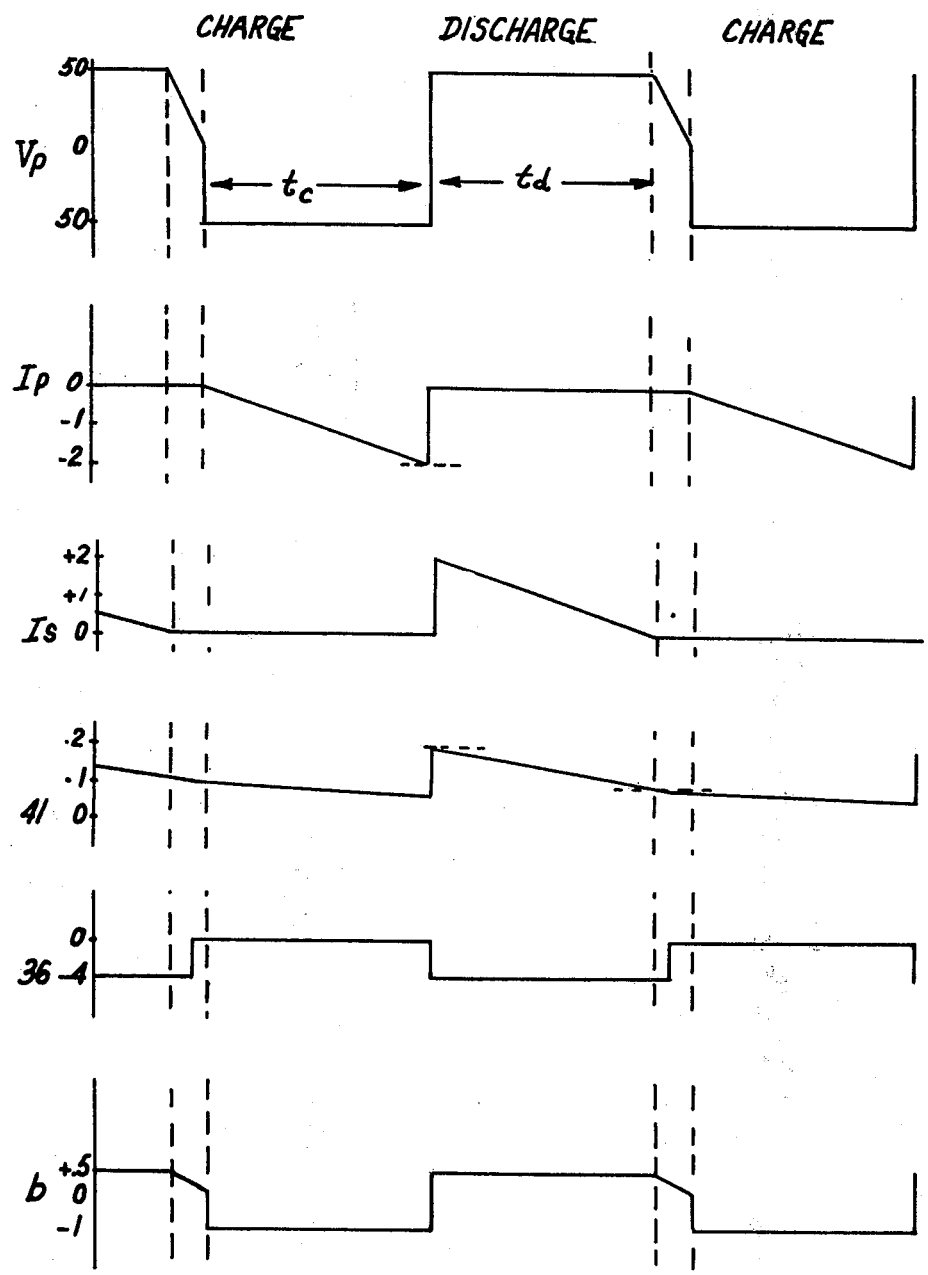
FIG. 2 is a timing diagram associated with the circuit of FIG. 1.

Voltage sensor 38 senses the output voltage on terminal 39 with respect to ground 40. When the output voltage exceeds a predetermined maximum, the binary output on lead 37 changes state to a high level. When the output voltage drops below this maximum level, the binary output signal changes state to its low level. The voltage sensor, coupled to other feedback circuitry, serves as a voltage limiter protection device for open circuit conditions. Another voltage sensor, 24, senses the polarity of the gated power signal on path 16. This sensor provides a reference voltage to comparator 13. A small negative voltage ($-1V$) is on output 25 when the voltage on path 16 is negative, and a small positive voltage ($+0.5V$) is on path 25 when the voltage on path 16 in positive. The binary voltage on path 25 is applied to the "b" reference input of voltage comparator 13. The function of the various current and voltage sensors is more easily understood in relation to the waveforms as shown in FIG. 2. The particular magnitudes of these waveforms are given in FIG. 2 only to illustrate the operation of this particular embodiment, and are in no way unique to the invention.

Referring now to both FIGS. 1 and 2, from an operational standpoint, it is clear from FIG. 2 that when switch 12 closes, i.e., turns ON, the full input voltage $-50V$, appears across the primary windings of transformer 14. As long as switch 12 remains closed, $I_p$, the current through the primary windings, will increase linearly at a V/L rate. (L being the total inductance from paths 16 to 32). One of the functions of current sensor 31 is to prevent $I_p$ from rising to too high a level. When $I_p$ reaches a predetermined maximum current, switch 12 must be turned OFF. Operationally, current sensor 31 senses the rising current and generates an analog voltage on path 27 proportional to the instantaneous magnitude of $I_p$. The analog signal is fed back through resistor 22 to the "a" input of voltage comparator 13. The operation of voltage comparator 13 is such that as long as the "b" input voltage is more negative than the "a" input voltage, the comparator will cause switch 12 to be in an ON state. When the "b" input voltage is more positive than the "a" input voltage, comparator 13 will cause switch 12 to be in an OFF state. Hence, when the negative voltage fed back to "a" via path 27 causes "a" to exceed the negative voltage on input "b", comparator 13 will turn switch 12 OFF.

When comparator 13 turns switch 12 OFF, the driving potential is removed from the transformer input, and the transformer discharge period begins. The energy stored in the magnetic field of the transformer, $\frac{1}{2}LI^2$, causes $V_p$ to reverse polarity as shown by the $V_p$ waveform in FIG. 2. Since current cannot flow through the open primary circuit, $I_p$ drops to zero, and an induced secondary voltage causes a secondary current, $I_s$, to flow. When $I_p$ drops to zero, an unwanted oscillation in the input circuit could develop were it not for the positive feedback action of voltage sensor 24. As long as $V_p$ is positive with respect to ground, voltage sensor 24 will inhibit switch 12 from turning ON by placing a small positive voltage at the "b" input of comparator 13. Were this "b" reference not changed, current sensor 31 could permit switch 12 to falsely turn ON when the primary current ceased, and thus inducing an unwanted oscillation.

During the discharge period, an induced secondary voltage causes a current, $I_s$, to flow in the secondary. This current has three circuit loops in which to flow. The first loop consists of conductor 34, diode 15, capacitor C1, and back through conductor 33 to the secondary. The second loop consists of conductor 34, diode 15, capacitor C2, current sensor 35, and back through conductors 41 and 33 to the secondary. And the third loop consists of diode 15, the load normally connected across terminals 39 and 40, current sensor 35, and back through conductors 41 and 33 to the secondary. Since the capacitance of C2 is much less than C1, most of $I_s$ flows in the first loop to charge capacitor C1. The rest of the current flows in the other two loops. Current sensor 35 is in both the second and third loops, and therefore, senses the sum of the currents in these loops. Waveform 41 in FIG. 2 shows the time varying characteristics of the current in conductor 41. As shown in FIG. 2, during the discharge period the current waveform is triangular. The current through the load is relatively constant so that waveform 41 reflects a fixed DC component. The triangular nature of the waveform is caused by capacitor C2. At the start of the discharge period, C2 provides current sensor 35 with a sudden surge of current. This current surge pushes the sensor over its "high" current threshold point, thereby causing the output control signal on conductor 36 to exhibit a high binary state, as shown by waveform 36 in FIG. 2. As the current in path 41 decreases to the previous current level, the output of current sensor 35 changes state to a low level as shown in waveform 36. The binary output on path 36 is applied to an integrator 30 and to one input of OR gate 29.

Current sensor 35 serves two functions. First, it causes the regulator circuit to vary the output voltage for changes in the load resistance to maintain output current constant. Second, it inhibits switch 12 from closing prematurely until the stored energy is removed from the transformer 14. Functionally $V_{OUT}$ is established for a given load by regulating $I_p$ peak. The output voltage, $V_{OUT}$, in steady state operation depends not only on the input voltage, $V_{IN}$, but also on the ratio of charge period, $t_c$, to discharge period, $t_d$, or more precisely Vout/Vin = tc/td. If $V_{IN}$ remains fixed, the ratio of $t_c$ to $t_d$ is established to obtain the desired $V_{OUT}$. And the ratio of $t_c$ to $t_d$ is affected by regulating the peak input current, $I_p$. Operationally, the regulation control is performed by the output of sensor 35 on path 36, via integrator 30 and resistor 21. By integrating the feedback signal on path 36 in integrator 30 and applying the result through a matching resistor 21, a control voltage is added to the analog voltage from path 27. It is the sum of the voltages on paths 27 and 28 which determines the permitted value of $I_p$ peak. When input "a" goes higher negatively than "b", comparator 13 turns switch 12 OFF interrupting $I_p$, and thus terminating the charge time. Correct choice of component values for integrator 30 and resistor 21 will cause $I_p$ to be the correct value so that energy input during the charge time just balances the energy output for steady state operation. Once balanced the system will tend to remain balanced for a wide range of input and output voltages. Small errors in average output current will cause the time above and below threshold to change incrementally. This in turn will incrementally change the high to low level time of the feedback on path 36 which in turn will change the output voltage on 28 of integrator 30. This voltage change modifies $I_p$ peak in a corrective way to return the average output current to the desired magnitude.

As shown in FIG. 1 the control signal on path 36 is also applied to the second input of OR gate 29. This feedback signal applied through OR gate 29, acts as an inhibit signal for switch 12 during the discharge period. As long as the control signal on path 36 remains in a high state ($-4V$), the effect of this feedback signal will be to keep switch 12 open. Therefore, during the complete discharge cycle, the switch will be prevented from closing. It may appear as though this feedback signal and the feedback signal on path 23-25 perform the same function, i.e., they both inhibit switch 12 during the discharge period, however, both inhibits are desirable. Switch 12 must not come ON if $V_p$ is positive, even if the desired feedback signal on 36 indicates output current is low. Also, the switch 12 must not come ON if the control signal on path 36 indicates $I_s$ is high, even if $V_p$ has dropped back to zero. At the start of the discharge period, the immediate application of a digital inhibit via OR gate 29 prevents any false and premature closing of switch 12. It is a tenet of this regulator that the transformer be charged with an amount of energy to just match the energy needs of the load for a full charge/discharge cycle — ignoring small internal circuit losses. This requires that during the discharge period, all of the energy must be removed from the transformer. Or, stated differently, the charge period cannot be restarted until the transformer has been completely discharged. Starting the charge period too soon, or too late, results in an increase in output current ripple and an increase in internal power losses. As previously described, several of the feedback control signals inhibit switch 12 during the discharge cycle and theoretically, it would appear that such controls are adequate to permit proper regulation. In practice, however, it has been found that if the start of the charging period is intentionally delayed momentarily, the circuit will operate in a more stable manner. Also, a small time gap allows the energy storage devices (other than C1 and C2) to discharge to a quiescent state. The transition period in FIG. 2 between the discharge-to-charge periods, marked by vertical dashed lines, indicates this intentional added delay period. (This added delay period is shown somewhat exaggerated for purposes of illustrating what occurs). Capacitor C3, connected across the primary circuit of transformer 14, causes the existance of this delay. C3 is a small damping capacitor (typically 5 μF) which controls the rate $V_p$ can reverse polarity, and hence it adds a very small delay between the discharge-to-charge periods is negligible. The added period is a minor wait period introduced deliberately to increase stability, and must not be confused with excess energy wait periods common to other systems. If $I_p$ peak is not controlled, excess energy pulses can cause an excessive rise in output current, and a long dead period ensues until this excess energy is dissipated. Under the normal operating load range of this circuit, a dead period will not occur.

What is claimed is:

1. A series-switching regulator providing a regulated output current from an unregulated DC (direct current) input power source, said regulator comprising:

switching means adapted for connection to an unregulated DC input power source to transfer energy therefrom, said means generating a gated power signal having a variable duty cycle;

transformer means coupled to said switching means and having an input coil with a current $I_p$ and an output coil with a current $I_s$, said transformer means also having a charging and discharging period, said transformer means receiving energy from said switching means during said charging period and releasing stored energy during said discharging period;

rectification means connected in series with said output coil and permitting current to flow in one direction;

first sensor means coupled to said input coil for providing a first control signal proportional to $I_p$;

first capacitive means connected in parallel with said series connected output coil and said rectification means, said capacitive means storing energy from said output coil during said discharging period and releasing energy during said charging period;

a first DC output terminal;

second sensor means having an input and first and second outputs, said input connected to said first DC output terminal and said first output connected to the junction of said first capacitive means and said output coil, said second sensor means producing a second control signal at said second output, said second control signal exhibiting a first binary state when the current through said second sensor means is above a predetermined level, and exhibiting a second binary state when this current is below the same predetermined level;

a second DC output terminal connected to the junction of said first capacitor means and said rectification means;

second capacitive means, connected in parallel with first and second DC output terminals, and providing said second sensor means with a surge of current at the start of the discharge period causing said second sensor means to exhibit said first binary state; and control feedback means coupled to said switching means for controlling the duty cycle of said gated power signal, and thereby controlling the magnitude of direct current to said first and second DC output terminals, said feedback means comprising:

integrator means responsive to said second control signal and providing a third control signal representative of the average of said second control signal;

added means responsive to said first and third control signals and providing a fourth control signal representative of the voltage sum of said first and third control signals;

voltage sensing means responsive to said gated power signal and providing a fifth control signal indicative of the voltage polarity of said gated power signal;

comparator means having a first and second input and an output, said fifth control signal coupled to the first comparator input, said fourth control signal coupled to the second comparator input, and the comparator output coupled to said switching means, said comparator means generating a sixth control signal at its output for controlling the duty cycle of said gated power signal; and means coupling said second control signal to said second input of said comparator means.

2. A current regulator as in claim 1 further comprising means for limiting the voltage at said output terminals, said means comprising:

means responsive to the voltage at said first and second DC output terminals for providing a seventh control signal, said signal being a binary signal and of one state when the voltage across said terminals is greater than a predetermined magnitude and of the opposite state when the voltage across said terminals is less than the same predetermined magnitude; and means coupling said seventh control signal to said second input of said comparator means.

3. A current regulator as in claim 2 wherein said rectification means includes a diode.

4. A current regulator as in claim 3 wherein said first sensor means includes a resistor, and the voltage across said resistor being the first control signal.

5. A current regulator as in claim 4 wherein said means coupling said second control signal to said second input of said comparator means further includes an OR gate having a first and second input and an output, said OR gate output connected to said second input of said comparator means and said OR gate first input connected to said second output of said second sensor means, and said second OR gate input connected to said output voltage responsive means and receiving said seventh control signal.

* * * * *